United States Patent
Hankison

[11] 3,993,090
[45] Nov. 23, 1976

[54] AUTOMATIC VALVING DEVICE

[76] Inventor: Paul M. Hankison, c/o Hankison Corporation 1000 Philadelphia St., Canonsburg, Pa. 15317

[22] Filed: Jan. 29, 1975

[21] Appl. No.: 545,013

[52] U.S. Cl. .............................. 137/195; 137/415; 137/416; 251/65
[51] Int. Cl.² .......................................... F16T 1/20
[58] Field of Search ........... 137/195, 415, 416, 429, 137/430; 251/65

[56] References Cited
UNITED STATES PATENTS

| | | | |
|---|---|---|---|
| 925,153 | 6/1909 | Barry | 137/449 |
| 2,998,825 | 9/1961 | Gleason et al. | 137/195 |
| 2,999,509 | 9/1961 | Hankison et al. | 137/195 |
| 3,418,789 | 12/1968 | Hoffman et al. | 137/195 X |
| 3,447,562 | 6/1969 | Hoffman | 137/429 X |
| 3,834,415 | 9/1974 | Herron | 137/202 |

Primary Examiner—Alan Cohan
Assistant Examiner—Gerald A. Michalsky
Attorney, Agent, or Firm—Donn J. Smith

[57] ABSTRACT

In an automatic valving device, the combination comprises a container, an exhaust valve mounted in a lower portion of the container, an arrangement for actuating the exhaust valve, a pilot valve mounted in an upper portion of the container and coupled to the actuating arrangement, and an elongated guideway extending generally between the pilot valve and the exhaust valve. A float is movably mounted on the guideway and is operatively coupled to the pilot valve. The float is movable along a length of the guideway between an upper pilot valve opened position and a lower pilot valve closing position. Magnetic members are mounted on the guideway and the float respectively. At least one of the magnetic members is magnetized, and the magnetic members are shaped for magnetically attractive engagement therebetween. The magnetic members are disposed so as to effect such engagement at the lower float position to provide a snap action for the float upon removal of the float from its lower position toward its upper position.

In a specific arrangement, a valve closure for the pilot valve can be provided with an assymetric portion so that the valve closure is removed with a prying action to multiply the mechanical advantage of the valving device. In another arrangement the upper and lower float positions are sufficiently and spatially separated so that the float impactingly engages the pilot valve closure adjacent the upper position of the float to enhance the mechanical advantage of the valving device.

4 Claims, 4 Drawing Figures

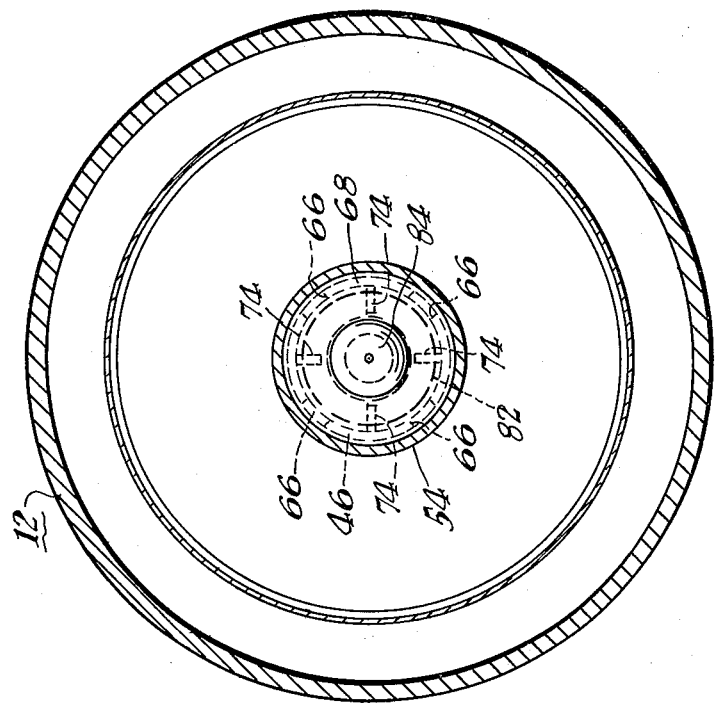
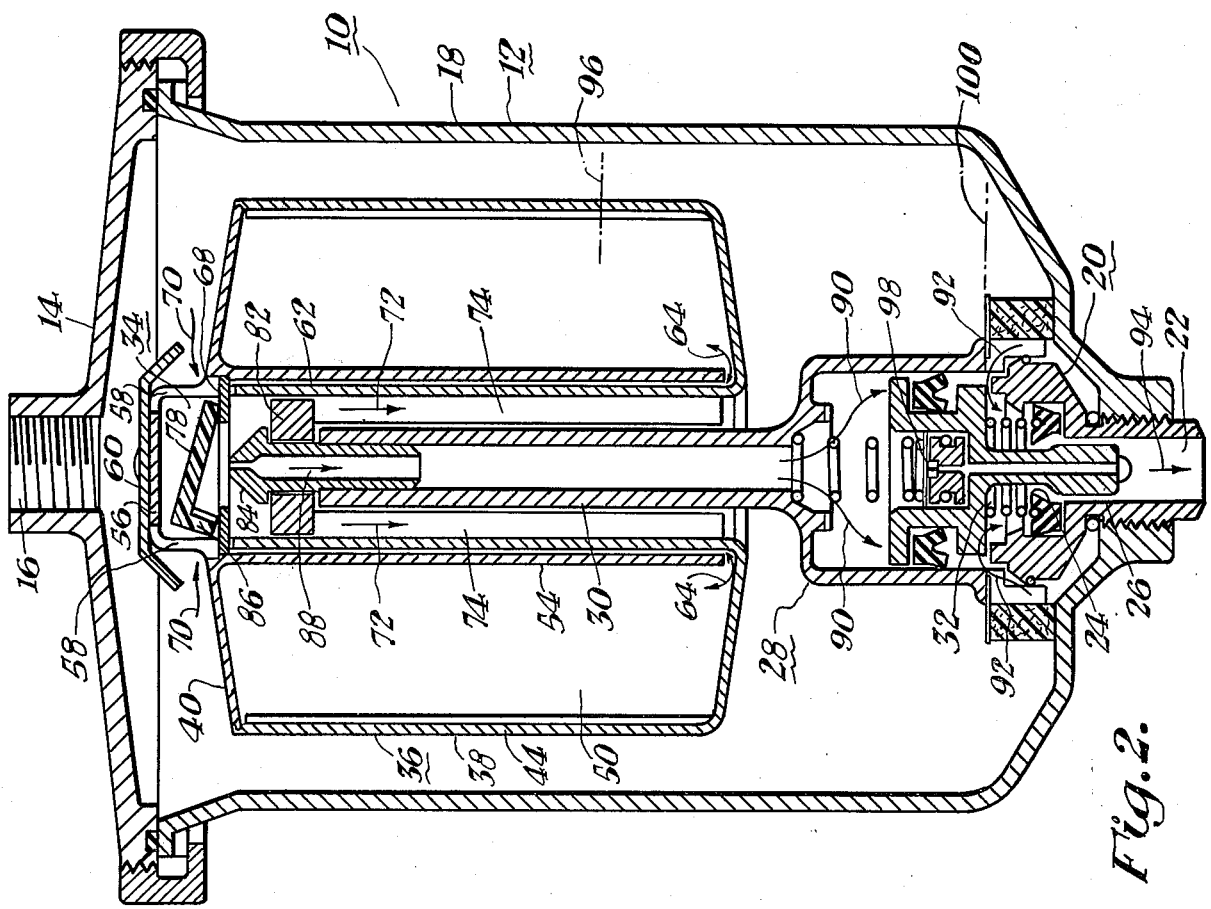

AUTOMATIC VALVING DEVICE

The present invention relates to an automatic valving device and more particularly to snap-acting means of superior mechanical advantage and/or repeatability for automatically valving a liquid for the purpose of liquid receiver discharging, liquid level control, and the like.

The automatic valving device of my invention is useful in a large number of applications wherein it is necessary or desirable to discharge periodically quantities of liquids of various types from a given system. Many of these applications involve movements of extensive quantities of compressed air or other gas, frequently under considerable pressure, in which moisture, lubricating oil or other contaminating liquid tends to accumulate. These liquid contaminants must be discharged periodically from the system, without significant loss of pressure or of compressed fluid.

Prior devices of differing kinds have been proposed for the discharge of condensate or other liquid from tanks and other receivers and for regulating liquid height in industrial vessels, receivers, and various types of tanks, including toilet tanks. The liquid level in these arrangements frequently is controlled by intake or discharge of liquid therefrom, when the liquid interface reaches preselected levels, by the use of float operators, diaphragms, and spring members, both balanced and unbalanced. Recurrent problems with prior devices have included undesirable size or complexity of equipment, unwanted duration and velocity of liquid flow therethrough, clogging, stuttering upon initiation of flow, escape of pressurized air or other gas, lack of repeatability, and other difficulties of failures in service, and in some cases, the presence of unsafe operating conditions in the event of failure of the equipment. These problems are aggravated where relatively smaller orifices and/or higher velocities are prescribed or required.

The aforementioned difficulties have been largely overcome by the drain devices of U.S. Pats. Nos. 3,999,509 and 3,635,238, entitled Device For Automatically Valving Liquid and Automatic Valving Device, respectively, both issued to the joint inventorship of myself and William Foster Walker. There are certain applications, however, where the escape of pressurized air or other fluid must be further minimized during a given drain cycle. This is especially desirable in those instances where components of the valving device are particularly subject to erosion caused by high fluid escape velocities.

Although the drain devices of the aforementioned U.S. Patents endow the respective float arrangements with a "snap-action" for superbuoyancy just prior to commencement of the drain cycle, there are a number of situations or applications wherein it is desired to provide a more compact or less complex structure or to increase still further the storage of potential energy in the superbuoyant state of a float-controlled mechanism. By providing a float and a float-controlled valving arrangement of unique construction together with an unexpected arrangement for potential energy storage, I am enabled to minimize further the escape of pressurized air or other fluid from the valving device and to eliminate in virtually all cases any tendency to stuttering at commencement of the drain cycle. A pilot valve associated with the float structure is uniquely arranged for ease of opening against the pressure of the system in which the valving device is used. In cooperation whth the superbuoyancy of the float structure at commencement of the drain cycle, the pilot valve opening arrangement of my novel drain device results in an overall mechanical advantage in the neighborhood of 20 to one or more, to assure reliable and repeatable operation under increasingly higher system pressures.

The automatic draining device of the present invention employs a float structure having a very short throw or range of vertical movement so that the valving device is of compact configuration employable where space is at a premium. In accord with another feature of the invention, the float is uniquely structured for self-purging during each drain cycle. The unique arrangement of potential energy storage associated with the float renders my automatic valving device highly repetitive so that the device commences each discharge cycle at substantially the same predetermined maximum level of contained liquid.

In one arrangement of the invention, the float is disposed for impacting engagement with a pilot valve closure to enhance the mechanical advantage of the automatic valving device. Impacting force is provided by the natural buoyancy of the float, and in addition the float is constrained at its lower position by a unique arrangement of the invention providing a snap action. The impacting engagement between the float and the pilot valve closure, then, is enhanced by the superbuoyancy of the float coupled with the aforementioned snap action. In another arrangement, the mechanical advantage of the valving device is multiplied several times by an opening procedure of the pilot valve involving a prying action.

The automatic valving device of the invention permits a reliably consistent, and repetitive opening of a pilot orifice against relatively high system pressures without resorting to a complex system of levers, pivots and/or counterweights. The number of moving parts associated with the pilot valve structure and the float is minimized to obtain a desirably and unexpectedly compact valving device.

I provide these desirable results and overcome the disadvantages of the prior art by providing in an automatic valving device, the combination comprising a container, an exhaust valve mounted in a lower portion of said container, means for actuating said exhaust valve, a pilot valve mounted in an upper portion of said container and coupled to said actuating means, an elongated guideway extending generally between said pilot valve and said exhaust valve, a float movably mounted on said guideway and operatively coupled to said pilot valve, said float being movable along a length of said guideway between an upper pilot valve opened position and a lower pilot valve closing position, and magnetic members mounted on said guideway and said float respectively, at least one of said magnetic members being magnetized, and said magnetic members being shaped for magnetically attractive engagement therebetween and being disposed so as to effect said engagement at said lower float position, said engagement providing a snap action for said float upon removal of said float from said lower position toward said upper position.

I also desirably provide a similar automatic valving device wherein said guideway is a relatively rigid conduit positioned in fluid communication with said pilot valve and said actuating means.

I also desirably provide a similar automatic valving device wherein said float and said magnetic members are of annular configuration and each loosely encircles said conduit.

I also desirably provide a similar automatic valving device including a valve disc for said pilot valve loosely mounted on said float.

I also desirably provide a similar automatic valving device including a valve closure for said pilot valve juxtaposed thereto, said upper and lower float positions being sufficiently and spatially separated so that said float impactingly engages said valve closure adjacent said upper float position whereby the mechanical advantage of the valving device is enhanced.

I also desirably provide a similar automatic valving device including an assymmetric portion on said pilot valve disc and juxtaposed to said float magnetic member so that said valve disc is removed from said pilot valve with a prying action, whereby the mechanical advantage of the pilot vlave opening procedure is multiplied.

I also desirably provide a similar automatic valving device wherein the multiplied mechanical advantage is of the order of 20: 1, or more.

During the foregoing discussion, various objectives, features and advantages of the invention have been set forth. These and other objectives, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same wherein:

FIG. 2 is a similar view of the apparatus as shown in FIG. 1, but showing the automatic valving device in its opened or discharge position;

FIG. 3 is a cross-sectional view of the apparatus as shown in FIG. 1 and taken along reference line III—III thereof; and, FIG. 4 is another cross-sectional view of the apparatus as shown in FIG. 1 and taken along reference line IV—IV thereof.

Figure 4:
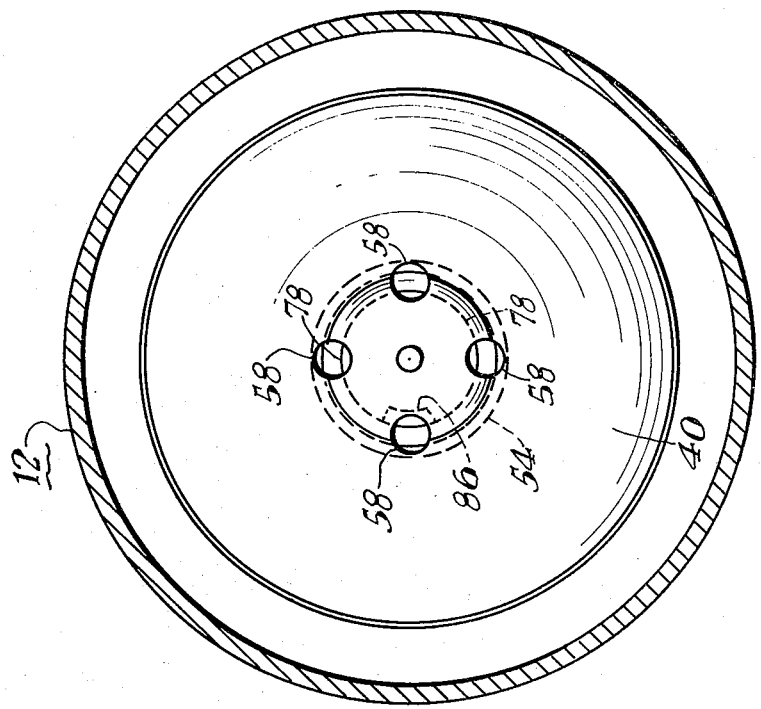

With more particular reference now to the drawings, my automatic valving device 10 exemplarily is arranged in the form of an automatically drained trap for periodically discharging water or other contaminating liquids from a pressurized gaseous system. The device 10 includes a housing or container 12 provided with an upper gas-receiving portion 14 having inlet port 16 and a lower liquid-receiving portion 18. An exhaust valve 20 is mounted in the lowermost part of the receiver 18. The exhaust valve 20 includes a drain passage arrangement 22, and a valved discharge orifice 24 which is normally closed by plunger assembly 26. Inverted over the discharge valve 20 and secured thereto is a cup-shaped operator body 28 including an upwardly projecting conduit portion or tubular stem 30, which serves as a guideway for the float 36 described below and which communicates with the plunger 26 or other discharge valve actuating means; and also with the pilot valve 34, likewise described below. The discharge valve 20 is available from Watts Regulator Company, (Fluid Power Div.) of Lawrence, Massachusetts, under catalogue No. SA-602MD and will not be described in further detail.

At the normal or closed position of the valving device 10, the plunger 26 is sealingly inserted into the orifice 24 of the discharge valve 20. The plunger assembly 26 is normally urged into a closed condition (FIG. 1) of the valving device 10 by plunger spring 32 and system pressure. The actuation of the plunger assembly 26 is controlled by a pilot valve assembly, denoted generally by reference numeral 34, which in turn is actuated by an annular float assembly 36.

The float structure 36 in the illustrated example is formed from a lower part 38 and an upper part 40. Desirably the float parts 38, 40 snap together or are otherwise engaged to form an upper circumferential seal 42. The lower float part 38 has an outer, disirably tubular wall 44 and a similarly shaped inner wall 46 spaced therefrom and connected by an annular bottom wall section 48 preferably of shallow conical configuration to facilitate drainage during purging. The lower float part 38 thus defines an annular buoyant volume 50.

The upper float part 40 includes a ceiling wall section 52 outwardly surrounding a depending generally central tubular wall section 54, and a pilot valve seat cage 56 positioned generally centrally above the depending wall 54. Any foreign matter that may enter the valving device 10 through its inlet port 16 is prevented from entering openings 58 of the valve seat cage 56 by a cover member 60 secured thereto. The purpose of the cage openings 58 will be described below.

Figure 1:
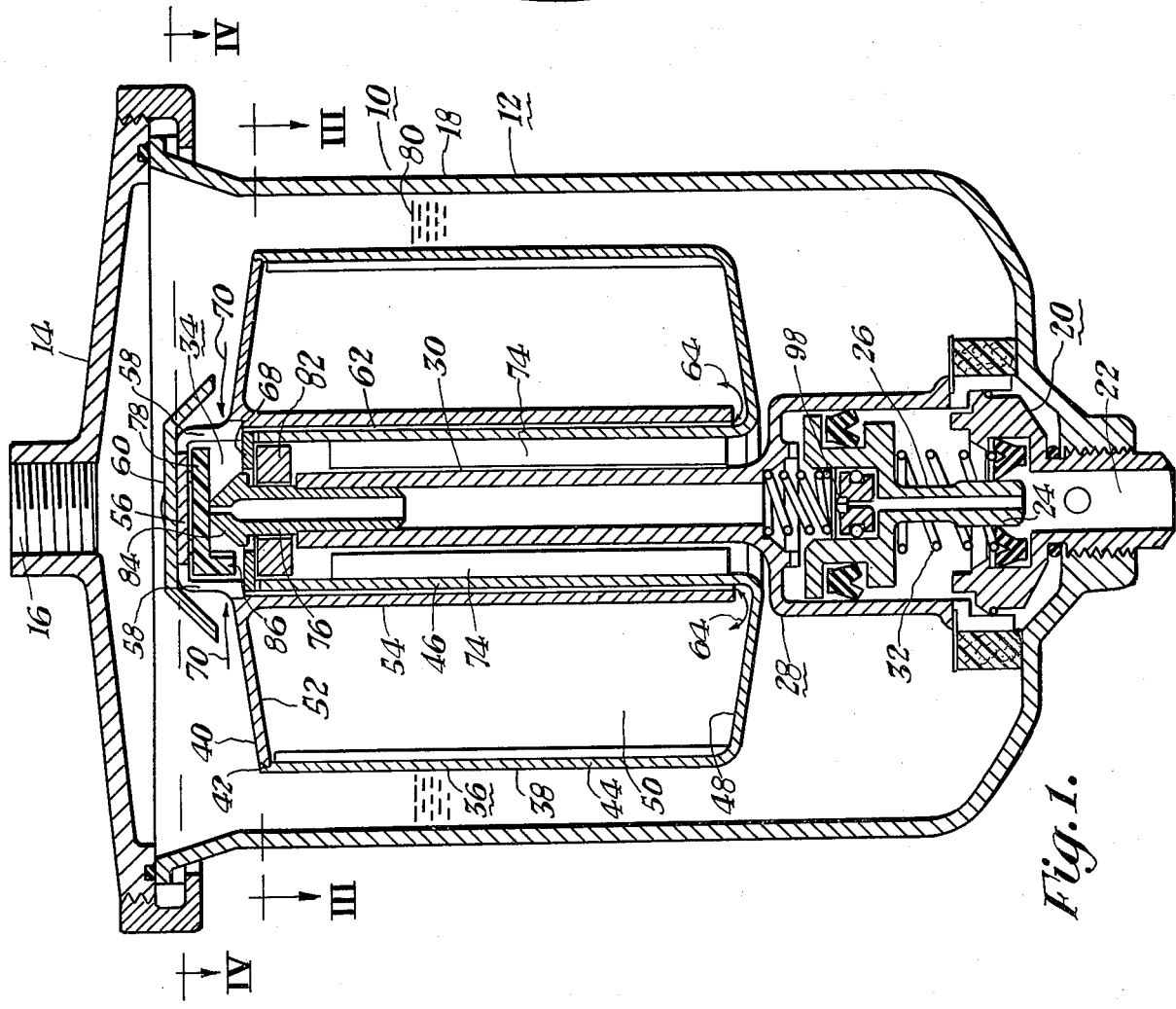
FIG. 1 is vertically sectioned view of one form of automatic valving device, arranged as an automatic drain trap and illustrating the principles of the invention.

When the float structure 36 is assembled as shown in FIGS. 1 and 2, the tubular wall 54 of the upper float part 40 protrudes deeply within the annular float volume 50 where it closely but spacedly surrounds the inner tubular wall 46 of the lower float part 40. This spatial relationship affords an annular and substantially vertical passage 62, for purging purposes, which communicates with the inner float volume 50 at the lower end of the depending wall 54 of the upper float part 38 as denoted by arrows 64. At its upper end, the annular passage 62 communicates through notches 66 (FIG. 3) around a magnetic member or armature ring 68 and through the openings 58 of the foraminous cage structure 56 (FIG. 4) with the upper regions of the valving device housing 12 (arrows 70).

With this arrangement a small positive pressure differential exists within the float structure 36 during the drain cyle (FIG. 2) such that any water or liquid that may have leaked into the float structure 36 is forced upwardly through the float passage 62 and notches 66 (FIG. 3) where it can flow downwardly through the inmost wall section 46 of the float (arrows 72, FIG. 2) to the lower or receiver portion 18 of the housing 12. After this purging operation and at the completion of the drain cycle, fluid pressures within the float 36 and the housing 12 are again equalized (arrows 70, FIG. 1).

In the illustrated arrangement of the invention the float assembly 36 is mounted for limited vertical movement along a suitable guideway, such as stem 30 of the operator body 28. The inmost tubular wall 46 of the float 36 desirably is spaced from the stem 30 by a number of vertically extending fins 74 (FIGS. 1, 2 & 3) whereby the float is slidably mounted on the guideway 30, which extends between the pilot valve 34 and the exhaust valve 20. The fins 74 also virtually eliminate the possibility of dirt or other foreign matter being entrapped between the float 36 and the stem 30 and possible hanging up of the float structure 36. Desirably, the substantially vertical movement of the float 36 along the stem 30 is delimited in the manner described below to afford a more compact valving device 10 and to endow the float 36 with a snap action of unexpectedly superior mechanical advantage.

The pilot valve 34, previously alluded to, includes an orifice member 76 secured by pressure fitting or other suitable securance means in the otherwise upper open end portion of the stem 30. The orifice member 76 is normally closed (FIG. 1) by a valve closure or disc 78 loosely mounted on the float 36 and loosely surrounded by the foraminous float cage 56, also previously noted, or otherwise juxtaposed to the pilot valve 34. When the float structure 36 is in its lowermost position (FIG. 1), i.e. during the filling cycle of the drain device 10, the valve cage 56 of the float presses the valve disc 78 into closing and sealing engagement with the orifice member 76. Accordingly, in the closed condition of the valving device 10 (FIG. 1) there is no flow through the orifice member 76 and a pressure differential exists between the interior of the stem 30 and the interior of the housing 12, with this pressure differential at times approaching the system overpressure, assuming that the discharge valve 20 communicates with the ambient.

As the liquid in the receiver 18 approaches the uppermost or drain-initiating level 80 (FIG. 1) the float 36 is retained in its lowermost position (FIG. 1) by engagement between the float magnetic member 68 and a guideway magnetic member 82, (aided by the weight of the float 36) against the then superbuoyancy of the float. The magnetic member 82 is somewhat loosely mounted on the guideway or conduit 30 (in this example at the orifice member 76) and can be confined as illustrated between the upper end of the conduit 30 and an overhanging expanded end portion 84 of the orifice member 76. The magnetically attractive engagement between the magnetic member 82 and the aforementioned magnetic member or armature ring 68 secured to the float 36 retains the float in its lowermost position until the liquid in receiver 18 reaches the uppermost level 80. Until the liquid level 80 is attained, the float cage 56 depresses the pilot valve disc or closure 79 to maintain the pilot valve 34 in its closed condition.

The purpose of the somewhat loose mounting of at least one of the magnetic members 68, 82, in this case the magnetic member 82, is to ensure complete alignment between the magnetic members 68, 82 for optimum magnetically attractive engagement therebetween.

One or both of the magnetic members 68, 82 can be magnetized to effect such magnetically attractive engagement at the lowermost float position (FIG. 1). In this example the lower or relatively stationary magnetic member 82 is magnetized. Desirably the magnet 82 is permanently face-polarized, i.e. the entire upper side of the magnet 82 is of a given uniform polarity while the entire underside of the magnet is of uniform opposite polarity. I have found that this disposition of polarities increases the magnetic attraction between the magnetic members 68, 82 and more importantly assures repetitive separations between the magnetic members 68, 82 at substantially the same predetermined liquid level 80. In contrast, I have also found that the liquid level 80 will vary as much as 30% (at the moment of separation between the magnet 82 and the armature ring 68) when the magnet 82 is radially polarized, i.e. with both poles on one side of the magnetic member. The somewhat loose mounting of the magnet 82 and consequent vibration thereof as the valving device 10 is cycled also facilitates the removal of any foreign matter that may collect on the top surface of the magnet 82. This virtually eliminates any possibility of spacing between the armature ring 68 and the magnet 82 and preserves an optimum force of magnetic attraction. I have found, however, that face polarization reduces the effect of any dirt or oil that would happen to accumulate between the magnet and the armature.

The magnetic attraction between the magnetic members 68, 82 provides a hold down force or means for inducing a superbuoyance of the float structure 36 until the liquid in receiver 18 reaches the uppermost level 80. At this level 80 the increasing superbuoyancy of the float structure 36 causes the float magnetic member 68 and the guideway magnetic member 82 to separate with a snap action, which in turn causes the float 36 to move immediately and rapidly in the upward direction until the upper ends of the spacing fins 74 (or other stop member on the float) engage the undersurface of the magnet 82 (or other stop member on the guideway 30) to terminate further upward movement of the float 36.

During this upward snap action of the float 36, its armature ring 68 (or other suitable projection) first impactingly engages the valve disc 78 at an intermediate float position and strips the valve closure off the orifice member 76 in a rapid separating movement. As intimated previously it is extremely important to remove the valve disc 78 rapidly from the orifice member 76 to avoid stuttering and erosion at the orifice member 76. The upward force required to remove the valve disc 78 is minimized by provision of an eccentric, depending tab 86 on the underside of the valve disc 78. Alternatively an assymmetric projection (not shown) can be provided on the armature ring 68 or elsewhere on the float 36 for this purpose. With this arrangement the armature ring 68 first engages the tab 86 when the float structure 36 snaps upwardly in order to remove the valve disc 78 with a leveraged tilting and prying action as the assymmetric projection 86 and the confronting surface of the armature ring 68 extend outwardly a considerable distance from the points of engagement between the valve closure 78 and the valve member 76. By thus opening the pilot valve 34, the mechanical advantage of the snap action of the float 36 is further increased by a factor of three or more.

Although the float 36 has a relative short throw as aforesaid, the upper and lower positions of the float 36 are sufficiently and spatially separated so that the float impactingly engages the valve disc 78, under impetus of the float's superbuoyancy coupled with its snap action when released at its lower position. This impacting engagement enhances considerably the mechanical advantage of the automatic valving device 10. In one arrangement of the invention it has been found that the impacting movement of the float coupled with its magnetically induced snap action provides a mechanical advantage of the order of about 7:1. As a result of the float's uniquely impacting movement the orifice area of the orifice member 76 can be considerably enlarged without exceeding the pilot valve opening forces thus provided by the float. The orifice member 76 is much less likely to become clogged by foreign material, and any possibility of stuttering and erosion is completely eliminated. The mechanical advantage contributes to a faster operation of the valving device 10, as pressure introduced through the pilot valve 34 can build up much more quickly within the operator body 28.

The mechanical advantage of the valving device 10 is further multiplied by the mechanical advantage associated with the aforementioned prying action. In the example noted above, the mechanical advantage is of the order of 20: 1, or more, and is at least 21: 1. Thus, the relatively small but impacting movement of the float, the snap action thereof, and the overall mechanical advantage of the valving device 10 result in extremely rapid but reliable operation.

After the valve disc 78 has been moved to the open position of the pilot valve 34 (FIG. 2) pressurized fluid from the upper portion of the housing 12 enters the orifice member 76 (arrows 70, 88, 90) and is forcefully applied to the upper surface of the plunger assembly 26 of the exhaust valve 20 to move the plunger assembly 26 from its closed position of FIG. 1 to its open position of FIG. 2. Thereafter liquid from the receiver 18 flows (FIG. 2) through the exhaust valve 20 (arrows 92, 94) to any suitable receptical or to the ambient in the usual manner.

When the liquid level in the receiver 18 has descended to some intermediate level, such as that denoted by chain outline 96 (FIG. 2), the weight of the float structure 36, in counter-balancing its residual buoyancy causes the float 36 to descend and to reclose the pilot valve 34. However, the exhaust valve 20 remains in its open position (FIG. 2) owing to a known delay function incorporated in to the exhaust valve 20. Briefly the exhaust valve is held open by the residual positive pressure differential then existing within the interior of the conduit 30 and in the upper portion of the operator body 28. This pressure differential is equalized by a bleed orifice 98 so that the exhaust valve assumes its normally closed position (FIG. 1), under impetus of the main plunger spring 32, at or slightly above the lowest permissible liquid level (chain outline 100, FIG. 2) to prevent escape of pressurized air or other fluid from the housing 12 through the drain orifice 24.

The aforedescribed assembly of the drain device 10 assures a reliable and compact structure. Most importantly the foregoing organization provides repetitive opening of the exhaust valve 20 at substantially the same upper liquid level 80 as well as subsequent, repetitive closing thereof at the lowest practical liquid level without escape of pressurized fluid from the housing or container 12.

From the foregoing it will be seen that a novel and efficient automatic valving device has been described. The description and illustrative materials employed herein are utilized for purposes of exemplifying the invention and not in limitation thereof. Accordingly, numerous modifications of the invention will occur to those skilled in the art without departing from the spirit and scope of the invention. Moreover, it is to be understood that certain features of the invention can be used to advantage without a corresponding use of other features thereof.

I claim:

1. In an automatic valving device, the combination comprising a container, an exhaust valve mounted in a lower portion of said container, means for actuating said exhaust valve, a pilot valve mounted in an upper portion of said container and operably coupled to said actuating means, an upstanding relatively rigid conduit positioned within said container in fluid communication with said pilot valve and said actuating means, an annular float slidably mounted on said conduit, said float being movable along a length of said conduit between an upper pilot valve opened position and a lower pilot valve closed position, a first annular magnetic member rigidly mounted on said float and loosely encircling said conduit, a second annular magnetic member, at least one of said magnetic members being magnetized, said pilot valve including an elongated valve member having an end portion thereof inserted into an upper end of said conduit, said valve member having a valving passage extending therethrough in communication with an interior of said conduit and having its upper end portion projecting from said conduit upper end, said second magnetic member loosely surrounding said valve member and being loosely confined thereon by said conduit upper end and by projection means on said valve member and spaced from said upper conduit end so that said second magnetic member is free for limited tilting and angularly displacement for proper physical and magnetic alignment with said first magnetic member, said magnetic members being shaped for magnetically attractive engagement therebetween at said lower float position and being disposed so as to effect such engagement to determine said lower float position, said engagement at upper liquid levels in said container providing a superbuoyancy of said float and further providing a snap action for said float upon removal thereof from said lower position toward said upper position, stop means mounted on said float and spaced from said magnetic members at said lower float position but engageable with said second magnetic member to determine said upper float position, a valve closure for said pilot valve loosely mounted on said float, a foraminous enclosure mounted on said float and loosely surrounding said valve closure so that said valve closure is freely alignable with said valve member in the closed condition of said pilot valve, and said first magnetic member being so positioned on said float as to remove said valve closure from said valve member at an intermediate position of said float.

2. The combination according to claim 22 including an asymmetric portion on said pilot valve closure and confronting said first magnetic member, said assymmetric portion and the confronting portion of said first magnetic member being remote from points of engagement between said valve closure and said valve member so that said valve closure is removed by said first magnetic member from said pilot valve member with a leveraged prying and tilting action, whereby the mechanical advantage of the pilot valve opening procedure is multiplied.

3. The combination according to claim 2 wherein said second magnetic member is magnetized, the magnetization thereof being in face-polarized fashion.

4. The combination according to claim 1 wherein said stop means are the upper end portions of inwardly and longitudinally extending fins on said float whereby said float is slidably mounted on said conduit.

* * * * *